(12) United States Patent
Ni (10) Patent No.: US 10,415,960 B2
(45) Date of Patent: Sep. 17, 2019

(54) ELEVATION ANGLE ESTIMATING SYSTEM AND METHOD FOR USER TERMINAL PLACEMENT

(71) Applicant: WorldVu Satellites Limited, St Helier, Jersey (GB)

(72) Inventor: Melvin S. Ni, Cupertino, CA (US)

(73) Assignee: WorldVu Satellites Limited, McLean, VA (US)

( * ) Notice: Subject to any disclaimer, the term of this patent is extended or adjusted under 35 U.S.C. 154(b) by 576 days.

(21) Appl. No.: 14/679,702

(22) Filed: Apr. 6, 2015

(65) Prior Publication Data

US 2016/0290794 A1    Oct. 6, 2016

(51) Int. Cl.
| | |
|---|---|
| *G01B 11/26* | (2006.01) |
| *G02B 13/00* | (2006.01) |
| *H04N 5/232* | (2006.01) |
| *G01S 19/00* | (2010.01) |
| *H04N 17/00* | (2006.01) |

(52) U.S. Cl.
CPC .............. *G01B 11/26* (2013.01); *G01S 19/00* (2013.01); *G02B 13/0015* (2013.01); *H04N 5/23222* (2013.01); *H04N 5/23238* (2013.01); *H04N 5/232945* (2018.08); *H04N 17/00* (2013.01)

(58) Field of Classification Search
CPC ..................................................... G01B 11/26
See application file for complete search history.

(56) References Cited

U.S. PATENT DOCUMENTS

| | | | |
|---|---|---|---|
| 2,410,667 | A | 11/1946 | Luboshez |
| 2,949,808 | A | 8/1960 | Thurow |
| 5,159,401 | A | 10/1992 | Decker, Jr. |
| 5,541,726 | A | 7/1996 | Nakajima |

(Continued)

FOREIGN PATENT DOCUMENTS

| | | |
|---|---|---|
| JP | 07-049372 A | 2/1995 |
| JP | 10-163721 A | 6/1998 |
| JP | 2004-012171 A | 1/2004 |
| WO | 9109325 A1 | 6/1991 |
| WO | 9957824 A2 | 11/1999 |

(Continued)

OTHER PUBLICATIONS

Officer: Lee W. Young, "International Search Report" dated Jun. 30, 2016 in related International PCT Application No. PCT/US16/25012, which is a counterpart of related U.S. Appl. No. 14/674,363.

(Continued)

*Primary Examiner* — Rowina J Cattungal
(74) *Attorney, Agent, or Firm* — Kaplan Breyer Schwarz, LLP (57) ABSTRACT

A system and a method for estimating the elevation angle of one or more objects surrounding a user terminal include a camera device for capturing an image of the sky and a display device for displaying the image of the sky captured by the camera device. One of the camera device and the display device generates an elevation limit marking in the image of the sky displayed by the display device. The elevation limit marking in the image of the sky defines an elevation angle above a horizon of the earth that all the one or more objects in a field of view of the camera device must remain below so that the user terminal has an unobstructed view of the sky in all azimuthal directions.

50 Claims, 9 Drawing Sheets

(56) References Cited

U.S. PATENT DOCUMENTS

| | | | |
|---|---|---|---|
| 5,757,315 A * | 5/1998 | Aoki | G01C 21/20 342/357.31 |
| 6,169,881 B1 | 1/2001 | Astrom et al. | |
| 6,313,865 B1 | 11/2001 | Driscoll, Jr. et al. | |
| 7,541,975 B2 | 6/2009 | Sever et al. | |
| 2006/0244749 A1 | 11/2006 | Kondo et al. | |
| 2008/0166011 A1 * | 7/2008 | Sever | G01S 19/28 382/100 |
| 2009/0055776 A1 * | 2/2009 | Audet | G06F 17/30716 715/835 |
| 2010/0201568 A1 | 8/2010 | Han et al. | |
| 2011/0210872 A1 | 9/2011 | Molander | |
| 2012/0121125 A1 | 5/2012 | Dimov | |
| 2012/0249745 A1 * | 10/2012 | Gagel | G06T 19/00 348/46 |
| 2012/0293678 A1 * | 11/2012 | Amor Molares | H04N 5/772 348/222.1 |
| 2013/0014699 A1 | 11/2013 | Jungerman et al. | |
| 2014/0161358 A1 | 6/2014 | D'Haire et al. | |
| 2014/0340427 A1 * | 11/2014 | Baker | G06T 3/0062 345/641 |
| 2015/0063069 A1 | 3/2015 | Nakadai et al. | |
| 2016/0363443 A1 | 12/2016 | Ni | |

FOREIGN PATENT DOCUMENTS

| | | |
|---|---|---|
| WO | 0014271 A1 | 12/2000 |
| WO | 2006113689 A2 | 10/2006 |
| WO | 2016199110 A1 | 12/2016 |

OTHER PUBLICATIONS

Authorized Officer: Blaine R. Copenheaver, "International Search Report" dated Jul. 12, 2016 in counterpart International PCT Application No. PCT/US2016/026207.

Authorized Officer: Jens Huschelrath, "International Search Report" dated Aug. 31, 2016 in related International PCT Application PCT/IB2016/053480, which is a counterpart of related U.S. Appl. No. 14/737,489.

Officer: Lee W. Young, "Written Opinion of the International Searching Authority" dated Jun. 30, 2016 in related International PCT Application No. PCT/US16/25012, which is a counterpart of related U.S. Appl. No. 14/674,363.

Authorized Officer: Blaine R. Copenheaver, "Written Opinion of the International Searching Authority" dated Jul. 12, 2016 in counterpart International PCT Application No. PCT/US2016/026207.

Authorized Officer: Jens Huschelrath, "Written Opinion of the International Searching Authority" dated Mar. 31, 2016 in related International PCT Application PCT/IB2016/053480, which is a counterpart of related U.S. Appl. No. 14/737,489.

"Related U.S. Appl. No. 14/737,489," filed Jun. 12, 2015.

"Related U.S. Appl. No. 14/674,363", filed Mar. 31, 2015.

"Non-Final Office Action", U.S. Appl. No. 14/674,363, dated Sep. 7, 2017 6 pp.

"Non-Final Office Action", U.S. Appl. No. 14/737,489, dated Sep. 27, 2017, 6 pp.

Officer Lingfei Bai, "International Preliminary Report on Patentability", International Patent Application PCT/US2016/026207, Issuance of Report Oct. 10, 2017, 8 pp.

Officer Agnes Wittman-Regis, "International Preliminary Report on Patentability", International Patent Application PCT/US2016/025012, Issuance of Report Oct. 12, 2017, 8 pp.

Lu Liru (Dr), Search Report and Written Opinion issued in corresponding Singapore patent application No. 11201707825V, dated Jul 6, 2018.

Extended European Search Report dated Oct. 9, 2018 in EP application No. 16777196.3.

"Extended European Search Report" issued in EP Application No. 16774110.7 dated Oct. 24, 2018.

* cited by examiner

ELEVATION ANGLE ESTIMATING SYSTEM AND METHOD FOR USER TERMINAL PLACEMENT

FIELD

The present disclosure relates to user terminals of non-geostationary satellite communications systems. More particularly, the present disclosure relates to a device and method for estimating the elevation angle of one or more objects surrounding a user terminal to help the user properly position the user terminal so that it has an unobstructed view of the sky.

BACKGROUND

Satellite systems for bringing low-cost broadband internet service to any location on the earth are currently being developed. Such systems typically include gateway antennas that link the internet to a fleet of non-geostationary satellites, which in turn link to inexpensive user terminals positioned on the earth. The user terminals deliver internet connectivity to residences and businesses.

The inexpensive user terminal mentioned above, includes an antenna that requires an unobstructed view over a large section of the sky in all azimuthal directions (north, south, east, and west directions) in order to receive uninterrupted service from the satellites. Trees, buildings, and mountains must remain below a certain elevation angle (the angle above the horizon i.e., the line at which the earth and sky appear to meet) in all the azimuthal directions. In some parts of the world, the maximum elevation angle can be as low as about 45 degrees. An example of such a user terminal is described in U.S. application Ser. No. 14/627,577, filed Feb. 20, 2015 and entitled "User Terminal Having A Linear Array Antenna With Electronic And Mechanical Actuation System."

Individual users with a minimum of expertise are likely to be mounting and installing the user terminal, therefore, it is essential that they be able to position the user terminals at their residences, business, and the like, in such a way that the user terminal has an unobstructed view of the sky.

To maintain low-cost internet service, the user should be capable of locating, mounting, installing, and positioning their user terminal without professional assistance. Because the user terminal must have an unobstructed view of the sky in all azimuthal directions, down to an elevation angle of about 45 degrees above the horizon in some applications, the ability of the user to locate and position their user terminal correctly is a significant challenge. Currently, users located and position their user terminal by visually estimating whether the terminal has an unobstructed view of the sky, which often leads to errors of up to 10 degrees and issues with dropout periods. Surveying equipment can be used to help locate and position the user terminals correctly, but such equipment is expensive and requires specialized skill to operate.

The problem with respect to providing an unobstructed view of the sky for the user terminal, is new in the area of telecommunications. Older wireless communication networks used lower radio frequencies that were unaffected by trees, buildings and similar obstructions. Newer communication systems operating at higher frequencies only require an antenna to have a clear view along one unchanging line-of-sight to a geostationary satellite. However, inexpensive user terminals, such as the one described in U.S. application Ser. No. 14/627,577 require an unobstructed view of the sky in all azimuthal directions in order to avoid unacceptably long dropout periods caused by blocked portions of the sky.

Accordingly, an inexpensive and easy-to-use system and method are needed for allowing a user to accurately estimate the elevation angle of one or more surrounding objects so that the user can locate and position a user terminal of a non-geostationary satellite communications system so that it has an unobstructed view of the sky in all azimuthal directions down to an elevation angle of about 45 degrees.

SUMMARY

Disclosed herein is a system for estimating the elevation angle of one or more objects surrounding a user terminal. The system, in various embodiments, may comprise a camera device for capturing an image of the sky, and a display device for displaying the image of the sky captured by the camera device, wherein one of the camera device and the display device generates an elevation limit marking in the image of the sky displayed by the display device, wherein the elevation limit marking defines an elevation angle above a horizon of the earth that all the one or more objects in a field of view of the camera device must remain below so that the user terminal has an unobstructed view of the sky in all azimuthal directions.

Also disclosed herein is a camera device for estimating the elevation angle of one or more objects surrounding a user terminal. The camera device, in various embodiments, may comprise an image sensor capturing an image of the sky. The camera device generates the elevation limit marking in the image of the sky that will be displayed by a display device.

Further disclosed herein is a display device for estimating the elevation angle of one or more objects surrounding a user terminal. The display device, in various embodiments, may comprise a display screen for displaying an image of the sky captured by a camera device and a processor. In some embodiments, the display device may include a software application, which when executed by the processor adds the elevation limit marking to the image of the sky displayed on the display screen. In other embodiments, the display device may include firmware, hardware, software, or any combination thereof, that adds the elevation limit marking to the image of the sky displayed on the display screen.

In some embodiments, the elevation angle defined by the elevation limit marking may comprise a maximum elevation angle.

In some embodiments, the camera device may include an image sensor for capturing the image of the sky.

In some embodiments, the image sensor may comprise a charge-coupled device.

In some embodiments, the image sensor may comprise a CMOS active-pixel device.

In some embodiments, the camera device may include an optical system for focusing light, representing the sky and the one or more objects in the field of view of the camera device, on the image sensor.

In some embodiments, the optical system may include a wide-angle lens.

In some embodiments, the optical system may include a reticle that generates the elevation limit marking that is superimposed on the image of the sky displayed on the display device.

In some embodiments, the camera device may include image processing and communication electronics.

In some embodiments, the image processing and communication electronics may include firmware, hardware, software, or any combination thereof, for image acquisition and wireless transmission the image of the sky to the display device.

In some embodiments, the image of the sky may be a real-time video image and wherein the image processing and communication electronics generates the real-time video image.

In some embodiments, the image of the sky may be a still image and wherein the firmware generates the still image.

In some embodiments, the image processing and communication electronics allows for one or more of BLUETOOTH, Wi-Fi, Internet, and cellular data transmission of the image of the sky to the display device.

In some embodiments, the image processing and communication electronics may include firmware, hardware, software, or any combination thereof, for wired transmission of the image of the sky to the display device.

In some embodiments, the image processing and communication electronics for wired transmission allows for a Universal Serial Bus connection of the camera device with the display device.

In some embodiments, the system may further comprise a Universal Serial Bus On-The-Go adaptor for wired connection of the camera device with the display device.

In some embodiments, the image processing and communication electronics adds the elevation limit marking to the image of the sky displayed on the display device.

In some embodiments, the camera device may include a processor for controlling the functions of the image processing and communication electronics.

In some embodiments, the display device may comprise a portable or a mobile device having a display screen for displaying the image of the sky captured by the camera device.

In some embodiments, the portable or mobile device may comprise a hand held device.

In some embodiments, the handheld device may comprise a smart phone or a tablet computer.

In some embodiments, the portable or mobile device may comprise a laptop computer.

In some embodiments, the display device may include firmware, hardware, software, or any combination thereof, for wireless reception of the image of the sky transmitted by the camera device.

In some embodiments, the firmware, hardware, software, or any combination thereof, allows one or more of BLUETOOTH, Wi-Fi, Internet, and cellular data reception of the image of the sky transmitted from the camera device.

In some embodiments, the display device may include firmware, hardware, software, or any combination thereof, for wired reception of the image of the sky transmitted by the camera.

In some embodiments, the firmware, hardware, software, or any combination thereof, for wired reception provides for a Universal Serial Bus connection between the display device and the camera device.

In some embodiments, the display device may include a software application, which when executed by a processor of the display device displays the image of the sky on the display device.

In some embodiments, when the software application is executed by the processor the software application adds the elevation limit marking to the image of the sky displayed on the display device.

In some embodiments, the display device may include firmware, hardware, software, or any combination thereof, that adds the elevation limit marking to the image of the sky displayed on the display device.

In some embodiments, the elevation limit marking may comprise a circle.

In some embodiments, if the one or more objects is substantially outside the elevation limit marking, the one or more objects are estimated to be below the elevation angle.

In some embodiments, if a portion of the one or more objects is substantially inside the elevation limit marking, the one or more objects are estimated to be above the elevation angle.

In some embodiments, the camera device and display device comprise an integral unit.

Further disclosed herein is user terminal which may comprise, in various embodiments, a housing, an antenna associated with the housing, and the above described camera device disposed on or integrated into the housing.

Further disclosed herein is user terminal which may comprise, in various other embodiments, a housing, an antenna associated with the housing, and the above described system disposed on or integrated into the housing.

Further disclosed herein is a method for estimating the elevation angle of one or more objects surrounding a user terminal. The method may comprise, in various embodiments, capturing an image of the sky with a camera device that is disposed on, attached to, disposed in, or disposed adjacent, to the user terminal, superimposing an elevation limit marking on the image of the sky, the elevation limit marking defining an elevation angle above a horizon of the earth that all the one or more objects in a field of view of the camera device must remain below so that the user terminal has an unobstructed view of the sky in all azimuthal directions, and displaying the image of the sky on a display device to ascertain the location of each of the one or more objects in the image relative to the elevation limit marking.

DETAILED DESCRIPTION

Figure 1:
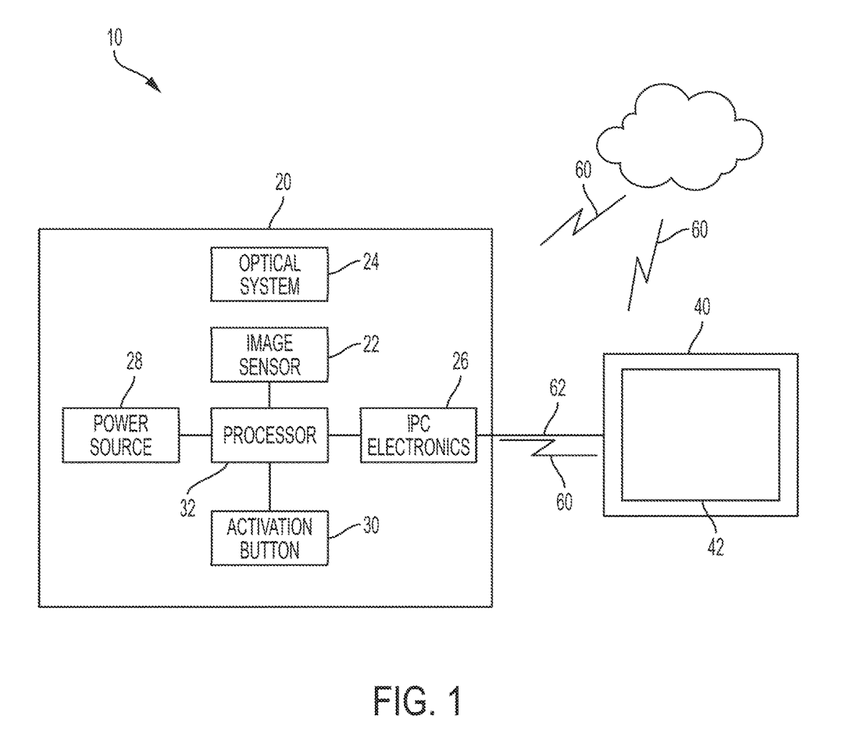
FIG. 1 is a functional block diagram of an embodiment of an elevation angle estimating system according to the present disclosure.

FIG. 1 illustrates an embodiment of an elevation angle estimating system 10 for allowing a user to accurately estimate the elevation angle of one or more surrounding objects, according to the present disclosure. The system 10 comprises a camera device 20 for capturing a real-time video image or a still image of the sky (sky image) and a display device 40 in communication with the camera device 20 to display the real-time video image or the still image of the sky, to a user.

As illustrated in FIG. 1, the camera device 20 and the display device 40 of the system 10 can be configured as separate components or units. The display device 40 can comprise a portable or mobile device with a display screen 42, such as a laptop computer or a hand held device, such as a smart phone or a tablet computer. The display device 40, in other embodiments, can comprise any device that is capable of communicating with the camera device 20 and displaying the sky image captured by the camera device 20, to the user.

Figure 2A:
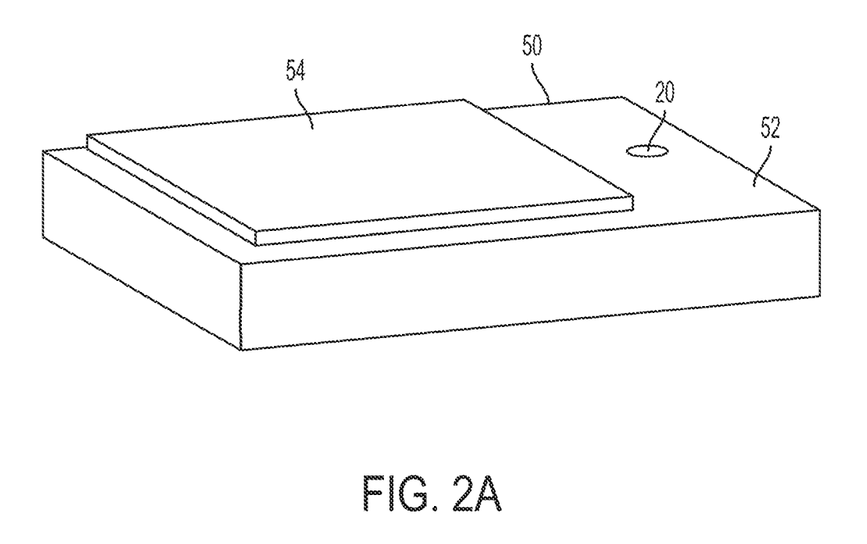
FIG. 2A is a perspective view of an embodiment of a user terminal which incorporates an embodiment of a camera device of the elevation angle estimating system.

The camera device 20 of the system 10 can include an image sensor 22, an optical system 24, image processing/communication (IPC) electronics 26, a power source 28, an activation button 30, and a processor 32. The camera device 20 can be a part of the user terminal. An example of such a user terminal is described in U.S. application Ser. No. 14/627,577, filed Feb. 20, 2015 and entitled "User Terminal Having A Linear Array Antenna With Electronic And Mechanical Actuation System." The entire disclosure of U.S. application Ser. No. 14/627,577 is incorporated herein by reference. In such embodiments, as illustrated in FIG. 2A, the camera device 20 of the system 10 can be integrated into a housing 52 of the user terminal 50 adjacent to the antenna 54 thereof and positioned so that it faces up toward the sky. The camera device 20 preferably should fit within a volume of about 1.0 cm³. In such an embodiment the preferred length, width, and height of the volume are each about 1.0 cm.

Figure 2B:
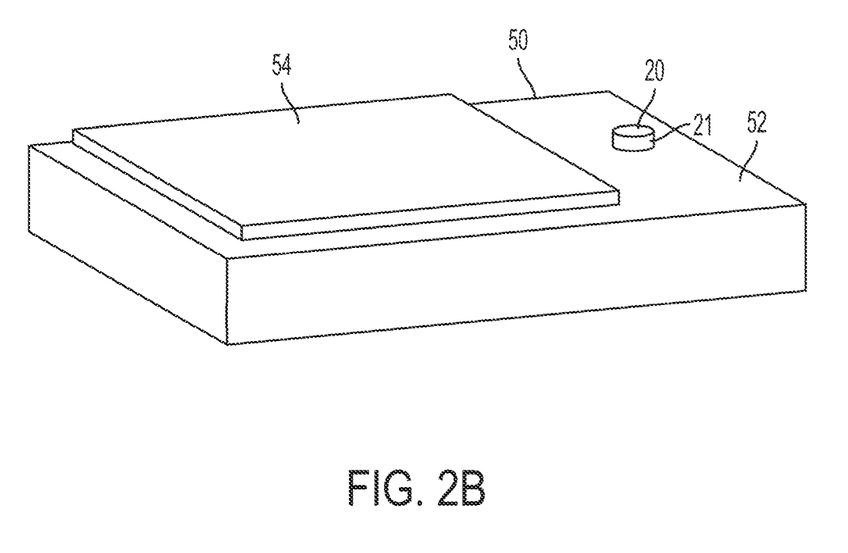
FIG. 2B is a perspective view of another embodiment of the user terminal with another embodiment of the camera device of the elevation angle estimating system removably mounted thereon.

Other embodiments of the camera device 20 of the system 10 may be configured as a portable unit 21 that can be removably mounted on the housing 52 of the user terminal 50, next to the antenna 54, facing up toward the sky, as illustrated in FIG. 2B.

Figure 2C:
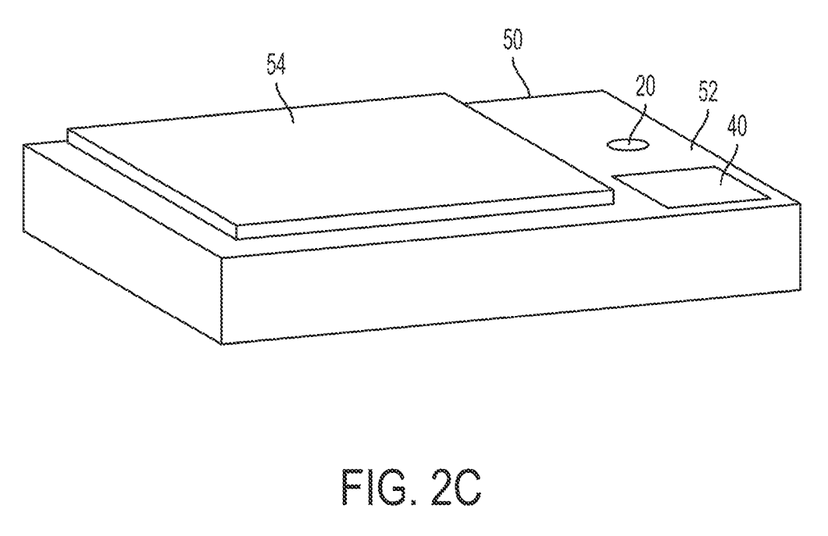
FIG. 2C is a perspective view of another embodiment of a user terminal which incorporates another embodiment of the elevation angle estimating system.
Figure 2D:
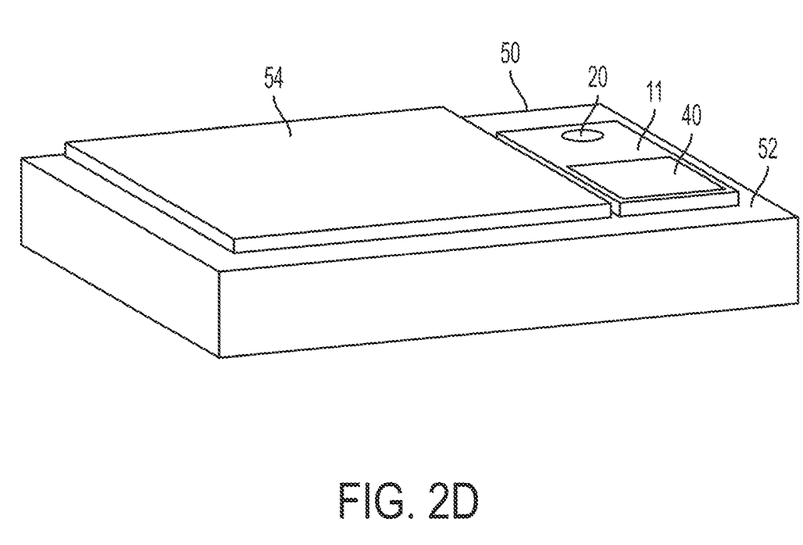
FIG. 2D is a perspective view of the user terminal illustrated in FIG. 2B with another embodiment of the elevation angle estimating system removably mounted thereon.

In further embodiments, the camera device 20 and the display device 40 of the system 10 can be integrated into the housing 52 of the user terminal 50 adjacent to the antenna 54 thereof and positioned so that the camera device 20 of the system 10 faces up toward the sky, as illustrated in FIG. 2C. Alternatively, as illustrated in FIG. 2D, the system 10 can be configured as a portable unit 11 that can be removably mounted on the housing 52 of the user terminal 50 next to the antenna 54, with the camera device 20 facing up toward the sky. The display 40 shown in the embodiments of FIGS. 2C and 2D can be configured to be rotated up about 45 to 90 degrees from the position illustrated in FIGS. 2C and 2D, so that the user does not obstruct the view of the camera 20 when viewing the display 40.

Referring again to FIG. 1, the image sensor 22 of the camera device 20 can comprise digital image sensor such as a charge-coupled device (CDD) image sensor or a CMOS active-pixel sensor (APS) image sensor. Any other suitable image sensor capable of capturing a real time video image or a still image of the sky can be used in other embodiments of the camera device 20.

Figure 3:
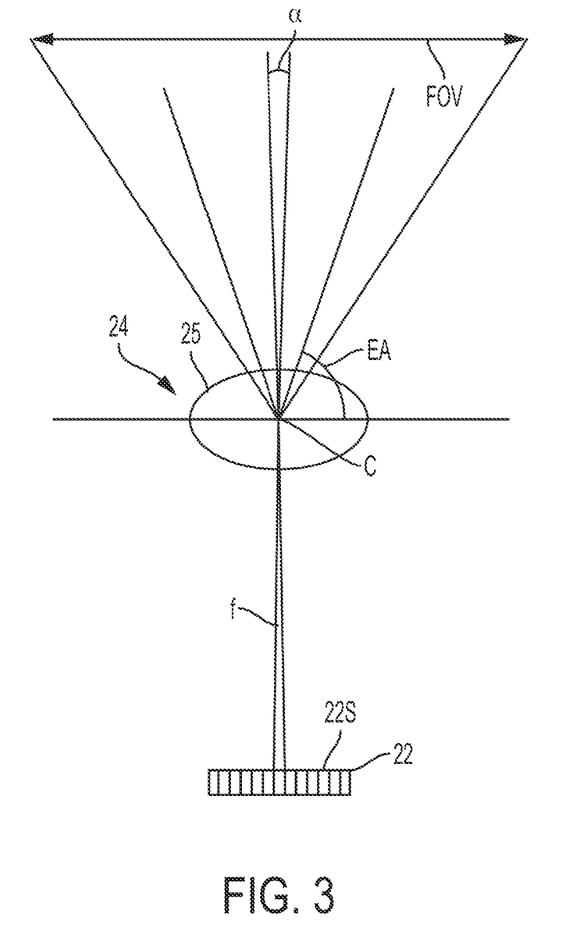
FIG. 3 is a schematic diagram of an embodiment of the camera device illustrating an optical system and an image sensor of the camera device of the elevation angle estimating system.

Referring to FIG. 3, the optical system 24 of the camera device 20 can comprise a wide angle lens arrangement 25 of one or more lenses, disposed in front of the image sensor 22. The wide angle lens arrangement 25 has a focal length F which is substantially smaller than the focal length of a standard lens, where the focal length is the distance from the center C of the lens arrangement 25 to the image focal point or surface 22s of the image sensor 22 and where the focal length F of the standard lens is about 50 mm (converted into 35 mm film camera format). The wide angle lens arrangement 25 provides the image sensor 22 with a wide angle of view that allows a requisite edge-to-edge field-of-view (FOV) of the sky of at least 90 degrees to be included in the real-time video image or the still image captured by the image sensor 22. The focal length F of the lens arrangement 25 will depend upon the FOV and the number and size of the pixels 22p of the image sensor 22. In one illustrative embodiment, the wide angle lens arrangement 25 can have a focal length F between about 5 mm and about 35 mm (converted into 35 mm film camera format).

Referring again to FIG. 1, the IPC electronics 26 of the camera device 20 may include video/still image acquisition firmware, hardware, and/or software and firmware, hardware, and/or software, for allowing the camera device 20 to wirelessly transmit the sky image to the display device 40. For example, but not limitation, the IPC electronics 26 can include firmware for BLUETOOTH, Wi-Fi, Internet, and/or cellular data wireless transmission 60 of the sky image to the display device 40. In such embodiments, the corresponding display device 40 (e.g., smart phone, tablet computer, and laptop computer) can include firmware for receiving the BLUETOOTH, Wif-FI, Internet, and/or cellular data of the sky image transmitted by the IPC electronics 26 of the camera device 20 and a video or photo software application that allows viewing of the sky image on the display screen 42 of the display device 40.

In other embodiments, the IPC electronics 26 of the camera device 20 may alternatively or additionally include firmware, hardware, and/or software, for allowing the camera device 20 to transmit the sky image to the display device 40 via a wired connection 62. The firmware for wired transmission 62 may include, without limitation, firmware for using a Universal Serial Bus (USB) connection. In such an embodiment, a USB On-The-Go (OTB) adaptor (not shown) can be provided for wired USB connection of the camera device 20 with the display device 40.

The power source 28 of the camera device 20 can comprise a rechargeable battery or a replaceable battery. Alternatively or in addition to the battery, the power source 28 can comprise (or further comprise) a USB connection to the display device 40 (which can also serve to recharge the rechargeable battery if equipped therewith) and/or a standard power plug connection.

The processor 32 of the camera device 20 can comprise a microprocessor that controls the functions of the IPC electronics 26, the activation button 30, and the image sensor 22.

Figure 4:
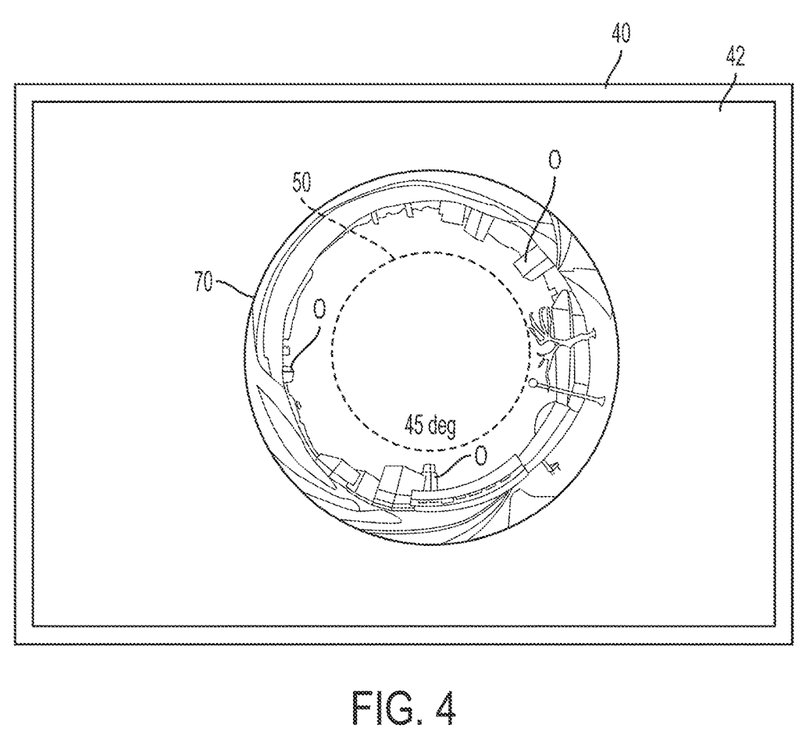
FIG. 4 is a top plan view of an embodiment of a display device of the elevation angle estimating system that illustrates an image of the sky captured by the camera device and transmitted to the display device when the user terminal has been properly located and positioned.

As illustrated in FIG. 4, the system 10 is further configured to superimpose or add a circular or like marking 50 (elevation limit circle) on or to the sky image 70 displayed on the display screen 42 of the display 40. The elevation limit circle 50 represents the locus of points at which obstructions exceed the maximum allowable elevation angle. In other words, the elevation limit circle 50 defines a maximum elevation angle above the horizon that objects surrounding the camera device 20 (and therefore, the user terminal), such as trees, buildings, mountains, and other structures in the FOV of the camera device's image sensor 22, must remain below so that the user terminal has an unobstructed view of the sky in all azimuthal directions and, therefore, can receive uninterrupted service from the satellites. In a preferred embodiment, the elevation limit circle 50 defines a maximum elevation angle EA (FIG. 3) of 45 degrees, +/−1.0 degrees. In other embodiments, the elevation limit circle 50 can define any other desirable maximum elevation angle EA above or below 45 degrees. Other embodiments of the system 10 can generate two or more concentric circular markings or elevation limit circles 50 on the sky image displayed on the display screen 42 of the display 40, which correspond to a different maximum elevation angles above the horizon that objects surrounding the camera device 20 must remain below.

In some embodiments, the elevation limit circle 50 can be generated in the sky image by providing a circular line in the optical system 24. In other embodiments, the elevation limit circle can have other shapes, depending upon the parameters of the fleet or constellation of satellites and the pointing orientation of each satellite in the constellation. For example, but not limitation, the optical system 24 can include a circular reticle that generates the elevation limit circle 50 which is superimposed over or on the sky image displayed on the display screen 42 of the display device 40.

In other embodiments, the elevation limit circle 50 may be electronically added to the real-time video image or still image by the video acquisition firmware of the camera device's IPC electronics 26. In still other embodiments, the elevation limit circle 50 may be electronically added to the real-time video image or still image by the software application running on the display device 40.

Referring again to FIG. 3, the size of the elevation limit circle 50 superimposed on or added to the sky image can be determined by calculating the diameter D of the elevation limit circle 50 measured in the number of the pixels of the image sensor 22 using the following equation:

$$D \text{ in number of pixels}=2*(90-\text{maximum elevation angle in degrees})/\alpha;$$

where α is the angle in degrees seen by one pixel of the image sensor 22. The angle in radians α' seen by one pixel is determined using the following equation:

$$\tan(\alpha')=p/f;$$

where p is the size of each pixel in mm of the image sensor and f is the focal length in mm; and
where the conversion from α' to α is as follows:

$$\alpha=\alpha'*180°/pi.$$

The use and operation of the elevation angle estimating system 10 will now be described. Prior to using the system 10, the user should locate and position the user terminal so that the antenna is level (relative to the ground). Any conventional level indicating instrument, such as a bubble level, can be used to determine whether the antenna is level. Such an instrument can be separate from or integrated into the housing of the user terminal. If the camera device 20 or the elevation angle estimating system 10 is integrated into the user terminal 50 as illustrated in FIGS. 2A and 2C, respectively, the camera device 20 should be level when the antenna 54 is level. If the camera device 20 or system 10 is separate from the user terminal 50 as illustrated in FIGS. 2B and 2D, respectively, the camera device 20 or system 10 should be placed on the housing 52 of the user terminal 50 and leveled along with the antenna 54.

Figure 5:
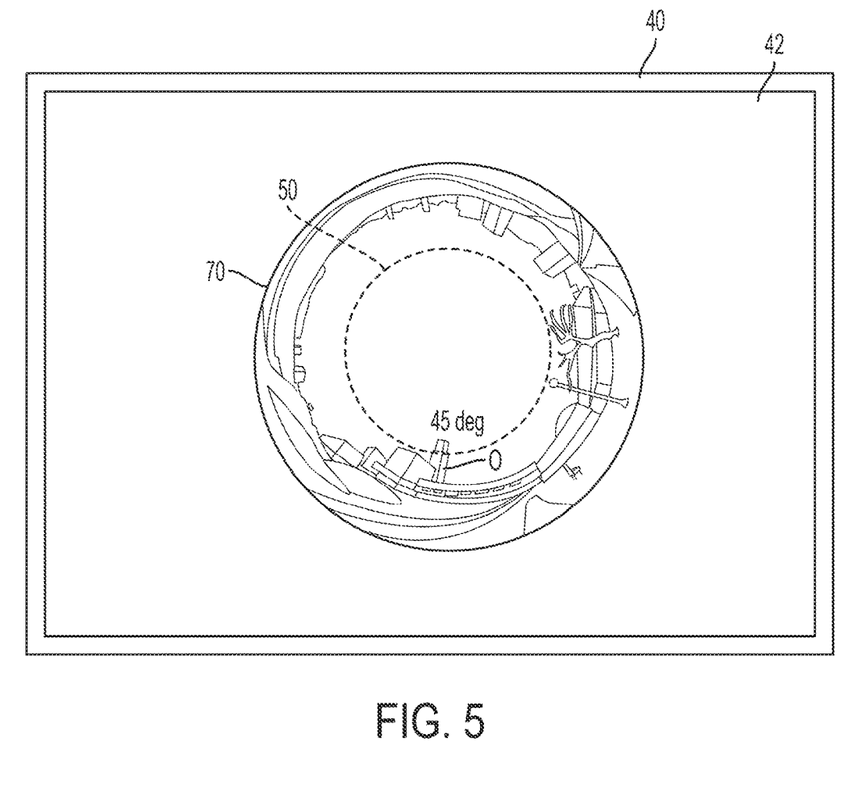
FIG. 5 is a top plan view of the display device illustrated in FIG. 4, which illustrates an image of the sky captured by the camera device and transmitted to the display device when the user terminal has been improperly located and positioned.

Once the user terminal 50 and camera device 20 of the system 10 have been leveled, the camera device 20 is activated by the activation button 30. The camera device 20 then captures a real-time video image or still image of the sky and transmits it wirelessly or by wire to the display device 40. As illustrated in FIG. 4, the proper location and position of the user terminal 50 is confirmed, if each one of the one or more of the objects O in the sky image 70 surrounding the user terminal 50 are substantially outside of the elevation limit circle 50, thereby indicating that the objects in the FOV of the camera device's image sensor 22 (and therefore the user terminal 50), are estimated to be below a desired maximum elevation angle. Consequently, the user terminal 50 has an unobstructed view of the sky in all azimuthal directions. If a portion of at least one of the one or more of the objects O in the sky image 70 is substantially inside the elevation limit circle 50 as illustrated in FIG. 5, that object O is estimated to be above the desired maximum elevation angle. Consequently, the user terminal 50 has an obstructed view of the sky in at least one azimuthal direction. Accordingly, the user terminal should be repositioned, or relocated and positioned so that each of the objects O in the sky image 70 is substantially outside of the elevation limit circle 50.

The elevation angle estimating system 10 of the present disclosure allows the user to estimate the elevation angle of surrounding objects to an accuracy of about 1 to 2 degrees, assuming the user terminal is level. Accordingly, the system 10 allows the user to estimate the elevation angle of surrounding objects with about 10 times the accuracy of prior art estimation methods where the user directly estimates the elevation angles of objects using only their eyes.

Figure 6:
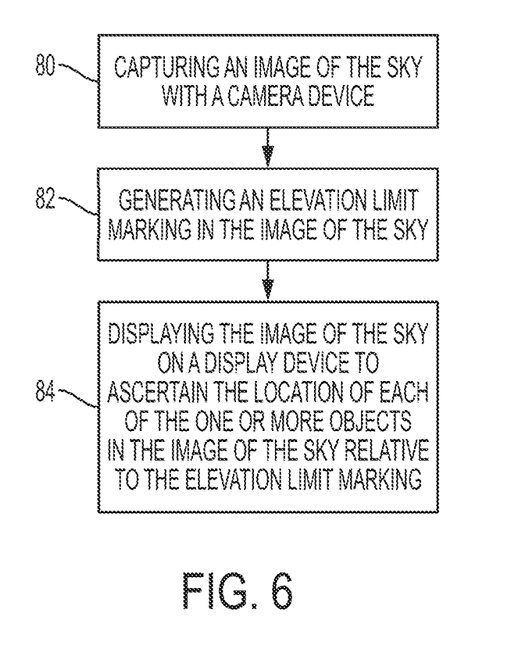
FIG. 6 is a flowchart illustrating an embodiment of a method for estimating the elevation angle of one or more objects surrounding a user terminal with the system of the present disclosure.

FIG. 6 is a flowchart illustrating an embodiment of a method for estimating the elevation angle of one or more objects surrounding a user terminal with the system 10 of the present disclosure. In block 80, an image of the sky is captured with the camera device 20 that is disposed on, attached to, disposed in, or disposed adjacent, to the user terminal 50. In block 82, the elevation limit marking is generated in the image of the sky. In block 84, the image of the sky is displayed on the display device 40 to ascertain the location of each of the one or more objects in the image relative to the elevation limit marking. If each one of the one or more objects is substantially outside the elevation limit marking, all the one or more objects are estimated to be below the elevation angle, and if a portion of any one of the one or more objects is substantially inside the reflected image of the elevation limit marking, that object is estimated to be above the elevation angle.

Although the elevation angle estimating system and method have been described in terms of illustrative embodiments, they are not limited thereto. Rather, the appended claims should be construed broadly to include other variants and embodiments of same, which may be made by those skilled in the art without departing from the scope and range of equivalents of the system and method.

What is claimed is:

1. A system for estimating the elevation angle of one or more objects surrounding a user terminal, the system comprising:

a camera device for capturing an image of the sky, the camera device including an image sensor having a predetermined number of pixels; and a display device for displaying the image of the sky captured by the camera device;

wherein one of the camera device and the display device generates an elevation limit marking on the image of the sky displayed by the display device;

wherein the elevation limit marking defines a maximum elevation angle above a horizon of the earth that all the one or more objects in a field of view of the camera device must remain below so that the user terminal has an unobstructed view of the sky in all azimuthal directions; and wherein the elevation limit marking has a diameter D that is measured in a number of pixels of the image sensor according to:

$$D \text{ in number of pixels} = 2*(90 - \text{maximum elevation angle in degrees})/\alpha,$$

where α is the angle in degrees seen by one of the pixels of the image sensor.

2. The system of claim 1, wherein the image sensor comprises a charge-coupled device.

3. The system of claim 1, wherein the image sensor comprises a CMOS active-pixel device.

4. The system of claim 1, wherein the camera device includes an optical system for focusing light, representing the sky and the one or more objects in the field of view of the camera device, on the image sensor.

5. The system of claim 4, wherein the optical system includes a wide-angle lens.

6. The system of claim 1, wherein the camera device includes image processing and communication electronics.

7. The system of claim 6, wherein the image processing and communication electronics includes firmware, hardware, software, or any combination thereof, for image acquisition and wireless transmission of the image of the sky to the display device.

8. The system of claim 6, wherein the image of the sky is a real-time video image and wherein the image processing and communication electronics generates the real-time video image.

9. The system of claim 6, wherein the image of the sky is a still image and wherein the firmware generates the still image.

10. The system of claim 6, wherein the image processing and communication electronics allows for one or more of BLUETOOTH, Wi-Fi, Internet, and cellular data transmission of the image of the sky to the display device.

11. The system of claim 6, wherein the image processing and communication electronics includes firmware, hardware, software, or any combination thereof, for wired transmission of the image of the sky to the display device.

12. The system of claim 11, wherein the image processing and communication electronics for wired transmission allows for a Universal Serial Bus connection of the camera device with the display device.

13. The system of claim 12, further comprising a Universal Serial Bus On-The-Go adaptor for wired connection of the camera device with the display device.

14. The system of claim 6, wherein the image processing and communication electronics adds the elevation limit marking to the image of the sky displayed on the display device.

15. The system of claim 6, wherein the camera device includes a processor for controlling the functions of the image processing and communication electronics.

16. The system of claim 1, wherein the display device comprises a portable or a mobile device having a display screen for displaying the image of the sky captured by the camera device.

17. The system of claim 16, wherein the portable or mobile device comprises a hand held device.

18. The system of claim 17, wherein the handheld device comprises a smart phone or a tablet computer.

19. The system of claim 16, wherein the portable or mobile device comprises a laptop computer.

20. The system of claim 1, wherein the display device includes firmware, hardware, software, or any combination thereof, for wireless reception of the image of the sky transmitted by the camera device.

21. The system of claim 20, wherein the firmware, hardware, software, or any combination thereof, allows one or more of BLUETOOTH, Wi-Fi, Internet, and cellular data reception of the image of the sky transmitted from the camera device.

22. The system of claim 1, wherein the display device includes firmware, hardware, software, or any combination thereof, for wired reception of the image of the sky transmitted by the camera.

23. The system of claim 22, wherein the firmware, hardware, software, or any combination thereof, for wired reception provides for a Universal Serial Bus connection between the display device and the camera device.

24. The system of claim 1, wherein the display device includes a software application, which when executed by a processor of the display device displays the image of the sky on the display device.

25. The system of claim 24, wherein when the software application is executed by the processor the software application adds the elevation limit marking to the image of the sky displayed on the display device.

26. The system of claim 1, wherein the display device includes firmware, hardware, software, or any combination thereof, that adds the elevation limit marking to the image of the sky displayed on the display device.

27. The system of claim 1, wherein if the one or more objects is substantially outside the elevation limit marking, the one or more objects are estimated to be below the maximum elevation angle.

28. The system of claim 1, wherein if a portion of the one or more objects is substantially inside the elevation limit marking, the one or more objects are estimated to be above the maximum elevation angle.

29. The system of claim 1, wherein the camera device and display device comprise an integral unit.

30. A user terminal comprising a housing, an antenna associated with the housing, and the camera device of claim 1 disposed on or integrated into the housing.

31. A user terminal comprising a housing, an antenna associated with the housing, and the system of claim 1 disposed on or integrated into the housing.

32. A camera device for estimating the elevation angle of one or more objects surrounding a user terminal, the camera device comprising:

an image sensor capturing an image of the sky, the image sensor having a predetermined number of pixels;

wherein the camera device generates an elevation limit marking in the image of the sky that will be displayed by a display device;

wherein the elevation limit marking defines a maximum elevation angle above a horizon of the earth that all of the one or more objects in a field of view of the camera device must remain below so that the user terminal has an unobstructed view of the sky in all azimuthal directions; and wherein the elevation limit marking has a diameter D that is measured in a number of pixels of the image sensor according to:

$D$ in number of pixels=2*(90−maximum elevation angle in degrees)/α, where α is the angle in degrees seen by one of the pixels of the image sensor.

33. The camera device of claim 32, wherein the image sensor comprises a charge-coupled device.

34. The camera device of claim 32, wherein the image sensor comprises a CMOS active-pixel device.

35. The camera device of claim 32, wherein the camera device includes an optical system for focusing light, representing the sky and the one or more objects in the field of view of the camera device, on the image sensor.

36. The camera device of claim 35, wherein the optical system includes a wide-angle lens.

37. The camera device of claim 32, wherein the camera device includes image processing and communication electronics.

38. The camera device of claim 37, wherein the image processing and communication electronics includes firmware, hardware, software, or any combination thereof, for image acquisition and wireless transmission of the image of the sky to the display device.

39. The camera device of claim 37, wherein the image of the sky is a real-time video image and wherein the image processing and communication electronics generates the real-time video image.

40. The camera device of claim 37, wherein the image of the sky is a still image and wherein the image processing and communication electronics generates the still image.

41. The camera device of claim 37, wherein the image processing and communication electronics allows for one or more of BLUETOOTH, Wi-Fi, Internet, and cellular data transmission of the image of the sky to the display device.

42. The camera device of claim 37, wherein the image processing and communication electronics includes firmware, hardware, software, or any combination thereof, for wired transmission of the image of the sky to the display device.

43. The camera device of claim 42, wherein the firmware, hardware, software, or any combination thereof, for wired transmission allows for a Universal Serial Bus connection of the camera device with the display device.

44. The camera device of claim 43, further comprising a Universal Serial Bus On-The-Go adaptor for wired connection of the camera device with the display device.

45. The camera device of claim 32, wherein the firmware, hardware, software, or any combination thereof adds the elevation limit marking to the image of the sky displayed on the display device.

46. The camera device of claim 32, wherein the camera device includes a processor for controlling the functions of the image processing and communication electronics.

47. A display device for estimating the elevation angle of one or more objects surrounding a user terminal, the display device comprising:

a display screen for displaying an image of the sky captured by a camera device including an image sensor having a predetermined number of pixels; and a processor;

wherein the display device includes a software application, which when executed by the processor adds an elevation limit marking to the image of the sky displayed on the display screen;

wherein the elevation limit marking defines a maximum elevation angle above a horizon of the earth that all the one or more objects in a field of view of the camera device must remain below so that the user terminal has an unobstructed view of the sky in all azimuthal directions;

wherein the elevation limit marking has a diameter D that is measured in a number of pixels of the image sensor according to:

$D$ in number of pixels=2*(90−maximum elevation angle in degrees)/α, where α is the angle in degrees seen by one of the pixels of the image sensor.

48. A display device for estimating the elevation angle of one or more objects surrounding a user terminal, the display device comprising:

a display screen for displaying an image of the sky captured by a camera device including an image sensor having a predetermined number of pixels;

wherein the display device includes firmware, hardware, software, or any combination thereof, that adds an elevation limit marking to the image of the sky displayed on the display screen;

wherein the elevation limit marking defines a maximum elevation angle above a horizon of the earth that all the one or more objects in a field of view of the camera device must remain below so that the user terminal has an unobstructed view of the sky in all azimuthal directions; and wherein the elevation limit marking has a diameter D that is measured in a number of pixels of the image sensor according to:

$D$ in number of pixels=2*(90−maximum elevation angle in degrees)/α, where α is the angle in degrees seen by one of the pixels of the image sensor.

49. A method for estimating the elevation angle of one or more objects surrounding a user terminal, the method comprising:

capturing an image of the sky with a camera device including an image sensor having a predetermined number of pixels, which is disposed on, attached to, disposed in, or disposed adjacent, to the user terminal;

superimposing an elevation limit marking on the image of the sky, the elevation limit marking defining a maximum elevation angle above a horizon of the earth that all the one or more objects in a field of view of the camera device must remain below so that the user terminal has an unobstructed view of the sky in all azimuthal directions, the elevation limit marking having a diameter D that is measured in a number of pixels of the image sensor according to:

$D$ in number of pixels=2*(90−maximum elevation angle in degrees)/α, where α is the angle in degrees seen by one of the pixels of the image sensor; and displaying the image of the sky on a display device to ascertain the location of each of the one or more objects in the image relative to the elevation limit marking.

50. The method of claim 49, wherein if all the one or more objects are substantially outside the elevation limit marking, the one or more objects are estimated to be below the elevation angle, and wherein if a portion of the one or more objects is substantially inside the elevation limit marking, the portion of the one or more objects is estimated to be above the elevation angle.

* * * * *